United States Patent [19]
Sugiura et al.

[11] Patent Number: 5,645,236
[45] Date of Patent: Jul. 8, 1997

[54] CRUSHING EQUIPMENT

[75] Inventors: Yoshitsugu Sugiura; Fumikazu Fukatami, both of Toyohashi, Japan

[73] Assignee: Teisaku Corporation, Japan

[21] Appl. No.: 676,908

[22] Filed: Jul. 8, 1996

Related U.S. Application Data

[63] Continuation of Ser. No. 461,684, filed as PCT/JP94/01831, Oct. 28, 1994, abandoned.

[30] Foreign Application Priority Data

Oct. 29, 1993 [JP] Japan ................................ 5-272125

[51] Int. Cl.$^6$ ............................................. B02C 1/06
[52] U.S. Cl. ............................... 241/266; 241/101.73
[58] Field of Search ............................... 30/134; 241/266, 241/101.73, DIG. 30

[56] References Cited

FOREIGN PATENT DOCUMENTS

| 233276 | 11/1985 | Japan. |
|---|---|---|
| 134470 | 6/1986 | Japan. |
| 211709 | 3/1990 | Japan. |
| 2200974 | 8/1990 | Japan. |
| 326846 | 6/1991 | Japan. |

*Primary Examiner*—Mark Rosenbaum
*Attorney, Agent, or Firm*—Palmatier, Sjoquist, Helget & Voigt, P.A.

[57] ABSTRACT

Crushing equipment includes a pair of crushing members disposed symmetrically with respect to a frame in juxtaposed relationship with each other, the crushing members being pivotally supported at substantially central portions thereof by the frame and having crushing portions each formed on one side of each crushing member and confronting each other, and a fluid-pressure cylinder connecting the other sides of the crushing members to each other. A fitting member is vertically movably mounted on the frame. The fluid-pressure cylinder is movably supported by the fitting member in a longitudinal direction of a cylinder tube of the fluid-pressure cylinder. A damper device is interposed between the fitting member and each of portions of the fluid-pressure cylinder positioned on both sides thereof, so that the fluid-pressure cylinder is resiliently held against the fitting member. With this construction, external forces acting on the crushing members are relieved, so that adverse effect on the fluid-pressure cylinder, a frame, etc. are eliminated as much as possible.

5 Claims, 3 Drawing Sheets

CRUSHING EQUIPMENT

This application is a continuation of U.S. application Ser. No. 08/461,684, filed Jun. 5, 1995 now abandoned.

TECHNICAL FIELD

The present invention relates to crushing equipment which is adapted for crushing buildings to be pulled down and other constructions.

BACKGROUND OF THE INVENTION

Conventionally, this type of crushing equipment has been proposed to include a pair of arms having crushing blades and having middle portions pivotally mounted on side plates, vertically elongated slots formed on the side plates and extending vertically along the vertical axis, trunnion pins protruding from side walls of a bidirectional hydraulic cylinder in a direction to intersect the vertical axis and slidably engaging the vertically elongated slots, and a pair of piston rods which are disposed on both sides of the hydraulic cylinder and movable to extend and to retract with respect to the vertical axis, and which are pivotally connected to the rear ends of the arms, respectively. (For example, see Japanese Utility Model Publication No. 2-11709 and Japanese Utility Model Publication No. 3-26846)

However, in the above conventional equipment, the hydraulic cylinder is mounted on the side plates by supporting with the trunnion pins, and therefore, if external impact forces are applied to the arms having the crushing blades when the hydraulic cylinder is in its stroke end, the trunnion pins directly receive the impact forces, and the impact forces are further transmitted to the bidirectional hydraulic cylinder having the extending trunnion pins as well as to the side plates, and an undesired impact force is applied to an arm of a work vehicle, etc. through a bracket for mounting the whole crushing equipment on the arm. The arms having the crushing blades are adapted not only for contacting or striking against a material to be crushed during a crushing operation but also for moving the crushed materials scattered on the ground, and therefore, external forces are frequently applied to the arms, thus causing various adverse effects.

It is accordingly an object of the present invention to provide crushing equipment which is operable to relieve external forces applied to crushing members so as to avoid as much adverse effect as possible on a fluid-pressure cylinder, a frame, etc.

DISCLOSURE OF THE INVENTION

In order to attain the above object, the subject matter of the present invention is crushing equipment comprising a pair of crushing members disposed symmetrically with respect to a frame in juxtaposed relationship with each other, the crushing members being pivotally supported at substantially central portions thereof by the frame and having crushing portions each formed on one side of each crushing member and confronting each other, and a fluid-pressure cylinder connecting the other sides of the crushing members to each other, characterized in that a fitting member is vertically movably mounted on the frame, that the fluid-pressure cylinder is movably supported by the fitting member in a longitudinal direction of a cylinder tube of the fluid-pressure cylinder, and that a damper device is interposed between the fitting member and each of portions of the fluid-pressure cylinder positioned on both sides thereof, so that the fluid-pressure cylinder is resiliently held against the fitting member.

With the above construction, when impacts (external forces) are applied to the crushing members, the damper device interposed between the fitting member supporting the fluid-pressure cylinder against the frame and each of portions of the fluid-pressure cylinder positioned on both sides for the crushing members absorb the impacts (external forces) so as to reduce the impacts (external forces) applied to the fluid-pressure cylinder to minimum through compression of the damper device disposed on one side or through extension of the damper device disposed on the other side in response to the external forces.

BEST MODES OF EMBODYING THE INVENTION

Figure 1:
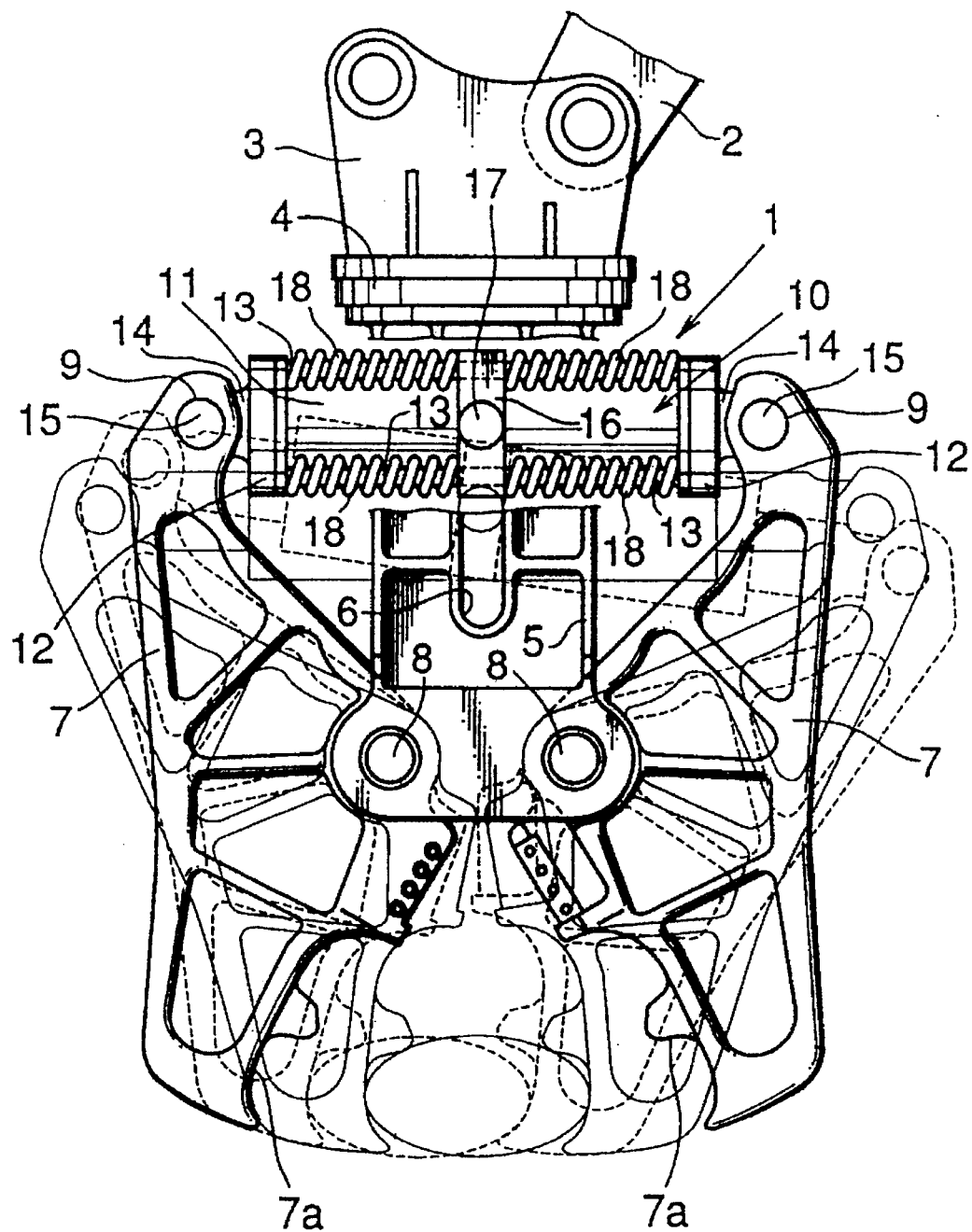
FIG. 1 is a front view of crushing equipment according to an embodiment of the present invention.
Figure 2:
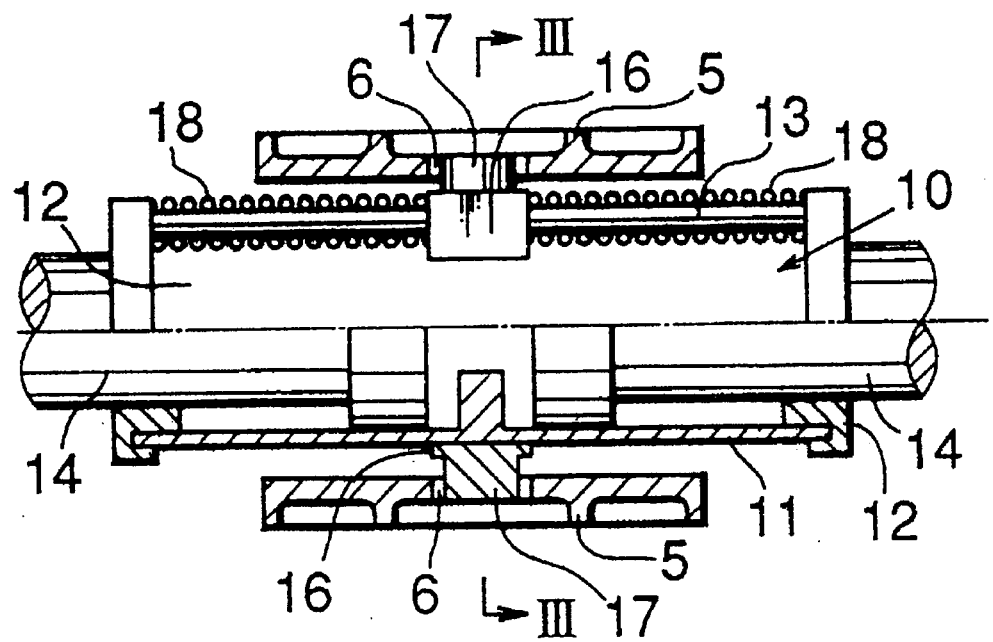
FIG. 2 is a vertical half sectional view of parts around a cylinder shown in FIG. 1.
Figure 3:
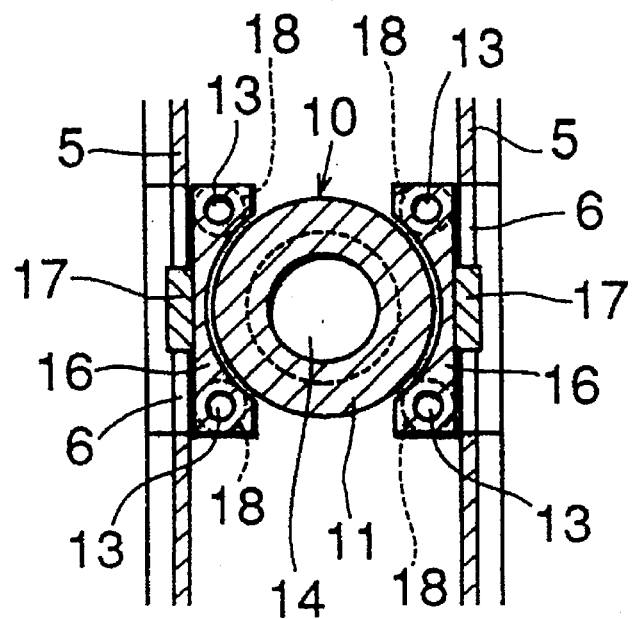
FIG. 3 is a sectional view taken along line III—III in FIG. 2.

Embodiments of the present invention will now be explained with reference to the drawings.

Numeral 1 designates the overall construction of crushing equipment mounted on an end portion of a frame 2 of a work vehicle such as a hydraulic shovel (not shown) in place of a bucket, etc. A bracket 3 is mounted on the end portion of the frame 2. A disc-like base plate 4 is positioned below the bracket 3 and is rotatable around its central axis. A pair of flat plate-like frames 5 are disposed on the lower surface of the base plate 4 in an integrally juxtaposed manner and extend vertically in parallel to each other. A fitting slot 6 each having an elongated configuration in a vertical direction is formed in the central portion of each of the frames 5 to extend therethrough.

A pair of crushing members 7 having symmetrical configurations with each other in right and left directions are symmetrically pivotally mounted on the frames 5 substantially at their central portions by means of main shafts 8 which are supported horizontally by lower ends of the frames 5 on both sides thereof. The crushing members 7 include crushing portions 7a positioned substantially at their lower ends on the inner sides thereof and confronting each other. The upper end of each of the crushing members 7 includes mounting holes 9 formed therethrough for pivotally mounting a piston rod of a fluid-pressure cylinder which will be explained later or for pivotally mounting a clevis.

A fluid-pressure cylinder 10 includes a cylinder tube 11, rod covers 12 disposed on both sides of the cylinder tube 11, four rods 13 for connecting rod covers 12 to each other, and right and left piston rods 14 disposed within the cylinder tube 11, so that the fluid-pressure cylinder 10 constitutes a bidirectional cylinder such as one acting as a hydraulic cylinder. End portions of the piston rods 14 are pivotally supported by mounting holes 9 of the pair of the crushing members 7 by means of connecting shafts 15, respectively.

The pair of the fitting members 16 have a predetermined width and are positioned to confront the pair of frames 5 and to confront peripheral portions of the cylinder tube 11 of the fluid-pressure cylinder 10 in spaced relationship therewith by a predetermined distance. The fitting members 16 are slidably fitted on and over the rods 13 positioned on the upper side and the rods 13 positioned on the lower sides, respectively, and have fitting shaft portions 17 formed integrally therewith and extending from positions confronting the frames 5. The fitting shaft portions 17 are vertically slidably fitted into the fitting slots 6 formed in the frames 5 therethrough, respectively.

In connection with each rod 13 of the fluid-pressure cylinder 10, springs 18 which constitute damper devices are resiliently interposed between both sides of the fitting members 16 and flanges of the rod covers 12 positioned on both sides in such a manner that the springs 18 surround their corresponding rods 13. With this construction, the fluid-pressure cylinder 10 is held in position by the fitting members 16 while being free in a direction of the axes of its rods. Although it is preferable that the springs 18 are set in a previously compressed state in this case, the springs 18 do not have to be pre-compressed in terms of their spring constant or strength.

The operation of the crushing equipment thus constructed will now be explained.

By means of operating fluid which is supplied to and discharged from the interior of the bidirectional fluid-pressure cylinder 10, both of the piston rods 14 are moved to advance or to retract, and at the same time therewith, the whole fluid-pressure cylinder 10 is moved vertically relative to the frames 5 by means of the fitting shaft portions 17 of the fitting members 16. By the advancing or retracting movement of both of the piston rods 14, the pair of the crushing members 7 are pivoted around their corresponding main shafts 8 so as to open and close their crushing portions 7a. Thus, as the whole fluid-pressure cylinder 10 is moved upwardly, both of the piston rods 14 are retracted (contracted), so that the crushing members 7 are pivoted symmetrically with each other to open the crushing portions 7a. On the other hand, as the whole fluid-pressure cylinder 10 is moved downwardly, both of the piston rods 14 are advanced (extended), so that the crushing members 7 are pivoted symmetrically in the directions opposite to those in the above case so as to close the crushing portions 7a. Thus, materials adapted to be crushed and positioned between the crushing portions 7a are crushed by the closing forces of the crushing portions 7a. (See thin lines in FIG. 1)

When a load is applied to one of the piston rods 14 during this operation, this one of the piston rods 14 stops its operation, and only the other piston rod 14 receiving no load is operated. Thus, the crushing operation is started when the load is applied to both piston rods 14. Therefore, when the external forces are applied on the condition that the piston rods 14 are positioned at middle positions of their stroke movement, the piston rods 14 move with the operating oil within the cylinder tube 11.

When impact forces (external forces) are applied to the crushing members 7 through impacting of the crushing members 7 on materials to be crushed, etc. during an operation for moving debris of a broken building or a crushing operation, and when the piston rods 14 are positioned at their stroke ends, the whole fluid-pressure cylinder 10 is pressed against the fitting members 16 in the rod axis direction, and in response to such pressing movement, the springs 18 disposed between the fitting members 16 and the flange of the rod cover 12 on the side of the crushing member 7 receiving the impacts are compressed, while the springs 18 disposed between the fitting members 16 and the flange of the rod covers 12 on the other side are extended within a range determined by the pre-compressed conditions when assembled, so that the impact forces (external forces) are absorbed by changes in the resilient forces of the springs 18 disposed on both sides of the fitting members 16, and that the impact forces (external forces) applied to the fluid-pressure cylinder 10 are relieved. Thus, although the pair of the crushing members 7 are pivotally (rotatably) mounted at four points through the connecting shafts 8 relative to the frames 5 and through the connecting shafts 15 relative to the piston rods 14 of the fluid-pressure cylinder 10 and are held by the springs 18 in a symmetrical manner in right and left directions, the symmetrical position holding state attained by the springs 18 is broken by change in the resilient forces of the springs 18 upon receiving the impact forces (external forces), so that the impact forces (external forces) acting on the fluid-pressure cylinder 10 are absorbed and are reduced to minimum. Therefore, the transmission of the impact forces (external forces) to the fitting members 16 and the frames 5 which hold the fluid-pressure cylinder 10 is eliminated as much as possible. (See dotted lines in FIG. 1)

Although in this embodiment, the springs 18 each having a coiled configuration are adopted as damper devices, other types of springs such as leaf springs or shock absorbers containing therein fluid may be adopted in place of the springs 18.

Additionally, although the fitting slots 6 are formed in the frames 5 and although the fitting shaft portions 17 are extended from the fitting members 16 for fitting into the fitting slots 6, they will be easily changed into an inverse arrangement.

Figure 4:
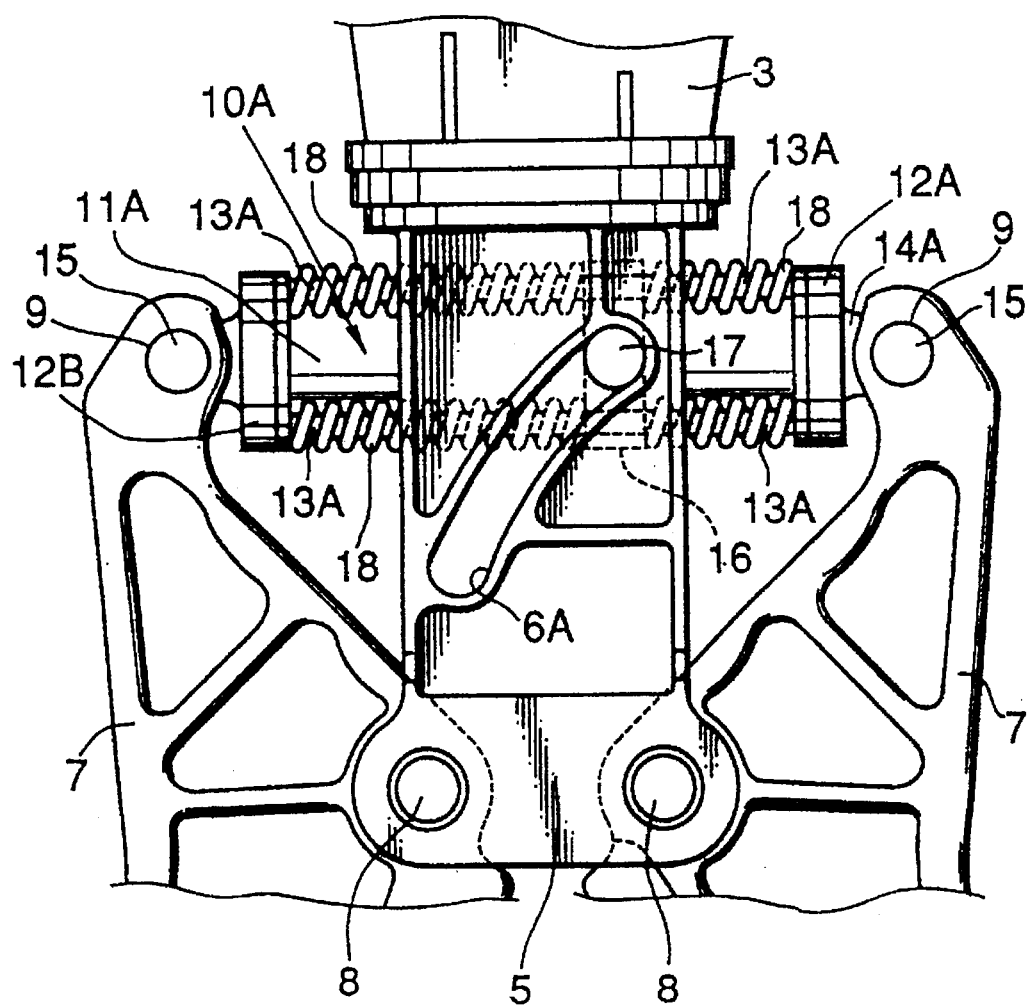
FIG. 4 is a front view, with a part broken away, of another embodiment of the present invention.

Further, although the bidirectional hydraulic cylinder having two piston rods are incorporated as the fluid-pressure cylinder 10 and although the vertically elongated fitting slots 6 are formed in the frames 5 for vertical movement of the fluid-pressure cylinder 10, a construction shown in FIG. 4 may be incorporated in place of this construction. The construction shown in FIG. 4 includes a fluid-pressure cylinder 10A of a type having a piston rod 14A on one side, and includes arcuate and vertically elongated fitting slots 6A formed in the frames 5 therethrough, so that a cylinder tube 11A is synchronously moved in connection with extending or contracting movement of the piston rod 14A. More specifically, the vertically elongated fitting slots 6 having predetermined arcuate configurations are formed in the central portions of the pair of flat plate-like frames 5 to extend therethrough. The fluid-pressure cylinder 10A such as a hydraulic cylinder includes the cylinder tube 11A, a rod cover 12A positioned on one side of the cylinder tube 11A, a cylinder end 12B positioned on the other side of the cylinder tuber 11A, four rods 13A connecting between the rod cover 12A and the cylinder end 12B, and the piston rod 14A disposed within the cylinder tube 11A and positioned on the right side thereof. One end of the piston rod 14A and the cylinder end 12B are pivotally mounted to the fitting holes 9 of the pair of the crashing members 7 by means of the connecting shafts 15, respectively. The fitting shafts 17 of the fitting members 16 having the same construction as the above embodiment are slidably fitted into the arcuate and vertically elongated fitting slots 6, and the description of parts similar to the first embodiment is omitted by affixing the same numerals in the drawings.

Thus, with this embodiment, the pivotal movement of the pair of the crushing members 7 is obtained through the contracting or extending movement of the cylinder tube 11A and the piston rod 14A of the fluid-pressure cylinder 10A relative to each other. The fluid-pressure cylinder 10A is moved arcuately vertically along the fitting slots 6 as the crushing members 7 are pivoted, and other operation or effect is the same as the above embodiment.

As described above, with the present invention, impact forces (external forces) applied on the crushing members are absorbed by damper devices interposed between a fitting member supporting a fluid-pressure cylinder against a frame and portions of the fluid-pressure cylinder positioned on both sides thereof for the crushing members, so that the impact forces (external forces) acting on the fluid-pressure cylinder can be reduced to minimum. This means that adverse effect on the fluid-pressure cylinder or the frames, etc. can be eliminated as much as possible and that undesired forces acting on a frame or a mounting pin of a bracket of a work vehicle such as a hydraulic shovel can be reduced.

We claim:

1. Crushing equipment comprising a pair of crashing members disposed symmetrically with respect to a frame in juxtaposed relationship with each other, said crushing members being pivotally supported at substantially central portions thereof by said frame and having crushing portions each formed on one side of each said crushing member and confronting each other, and a fluid-pressure cylinder connecting the other sides of said crushing members to each other, characterized in that a fitting member is vertically movably mounted on said frame, that said fluid-pressure cylinder is movably supported by said fitting member in a longitudinal direction of a cylinder tube of said fluid-pressure cylinder, and that damper means is interposed between said fitting member and each of portions of said fluid-pressure cylinder positioned on both sides thereof, so that said fluid-pressure cylinder is resiliently held against said fitting member.

2. The crushing equipment as defined in claim 1 wherein said damper means is a coil spring disposed between said fitting member and each of engaging portions positioned on both sides of said cylinder tube.

3. The crushing equipment as defined in claim 2 wherein said coil spring is mounted in a previously compressed condition.

4. The crushing equipment as defined in claim 1 wherein said fluid-pressure cylinder includes two piston rods slidably movable within said cylinder tube, and wherein said piston rods are connected to one and the other of said crushing members, respectively.

5. The crushing equipment as defined in claim 1 wherein said fluid-pressure cylinder includes a single piston rod slidably movable within said cylinder tube, said piston rod is connected to one of said crushing members, and wherein said cylinder tube is connected to the other of said crushing members.

* * * * *